May 7, 1968   E. H. LAND   3,382,073
PHOTOGRAPHIC PRODUCT CONTAINING DYE DEVELOPERS
Filed Dec. 30, 1966   2 Sheets-Sheet 1

INVENTOR.
Edwin H. Land
BY
Brown and Mikulka
and
Stanley H. Mervis
ATTORNEYS

May 7, 1968  E. H. LAND  3,382,073
PHOTOGRAPHIC PRODUCT CONTAINING DYE DEVELOPERS
Filed Dec. 30, 1966  2 Sheets-Sheet 2

INVENTOR.
Edwin H. Land
BY Brown and Mikulka
and
Stanley H. Mervis
ATTORNEYS

United States Patent Office 3,382,073
Patented May 7, 1968

3,382,073
PHOTOGRAPHIC PRODUCT CONTAINING
DYE DEVELOPERS
Edwin H. Land, Cambridge, Mass., assignor to Polaroid Corporation, Cambridge, Mass., a corporation of Delaware
Continuation-in-part of application Ser. No. 249,922, Jan. 7, 1963, which is a continuation-in-part of application Ser. No. 705,845, Dec. 30, 1957. This application Dec. 30, 1966, Ser. No. 606,234
2 Claims. (Cl. 96—77)

ABSTRACT OF THE DISCLOSURE

A method of forming dye dispersions is disclosed wherein the dye is vacuum deposited upon an organic polymeric material, following which the vacuum deposited dye and the polymeric material are mixed with a liquid which is a solvent for the polymeric material but a nonsolvent for the dye. The resulting fine dispersion of the dye within the polymeric material is particularly useful in forming dye-containing layers of photosensitive elements.

---

This application is a continuation-in-part of Ser. No. 249,922 filed Jan. 7, 1963 (now U.S. Patent No. 3,295,972 issued Jan. 3, 1967) as a continuation-in-part of Ser. No. 705,845, filed Dec. 30, 1957 and now abandoned.

The present invention relates, in general, to methods for producing fine dispersions of dye developers and, more particularly, to a novel method for producing a fine dispersion of exceptionally uniform character, and to photographic products incorporating such dispersions.

Primary objects of the present invention are to provide a process for producing a dispersion of a finely divided dye developer distributed uniformly in an external phase incompatible therewith, the process comprising the steps of first vacuum depositing the dye developer onto a matrix material mechanically possessing large surface area, and then blending the materials in order to disperse the dye developer in the external phase material; and to provide a novel photographic product incorporating such a fine dispersion, prepared in the foregoing way, as a color medium.

Other objects of the invention will in part be obvious and will in part appear hereinafter.

The invention accordingly comprises the several steps and the relation and order of one or more of such steps with respect to each of the others, and the scope of the application of which will be indicated in the claims.

For a fuller understanding of the nature and objects of the invention, reference should be had to the following detailed description taken in connection with the accompanying drawings wherein.

Generally, as indicated above, the processes of the present invention herein disclosed involve vacuum depositing at least part of the material, i.e., a dye developer, that is to constitute the internal phase onto a matrix material mechanically possessing large surface area, and then blending the materials in order to disperse or to prepare to disperse the internal phase material in at least part of the material that is to constitute the external phase. The step of vacuum depositing involves either evaporating or sputtering at pressures below 100 microns of mercury and usually within the range of from 0.1 to 100 microns of mercury, these pressures being produced by continuous evacuation to ensure the rapid removal of any gases produced during the vacuum deposition process. The internal phase material is transmitted to the matrix material in submicroscopic, e.g., molecular or atomic, form. The matrix material, which may constitute at least a proportion of the external phase, initially is in in powder-like or sheet-like form for the purpose of providing large surface area per mass. Where the matrix material is to constitute the external phase exclusively, the ultimate dispersion may be produced from the coated matrix material by blending, for example, by molding under heat or casting, spraying or flowing from solution. Where the matrix material is not to constitute the external phase exclusively, the matrix material, after being coated, may be blended in any suitable way with the remaining materials of the external phase, for example, may be dissolved in a solution already containing these remaining materials. The present invention provides a flexible technique for providing dispersions in which the internal phase, the external phase or both comprise a plurality of different materials. Thus, one or more internal phase materials may be vacuum deposited on one or more matrix materials and the resulting materials blended with one or more additional materials to provide a dispersion of desired formulation.

Figure 1:
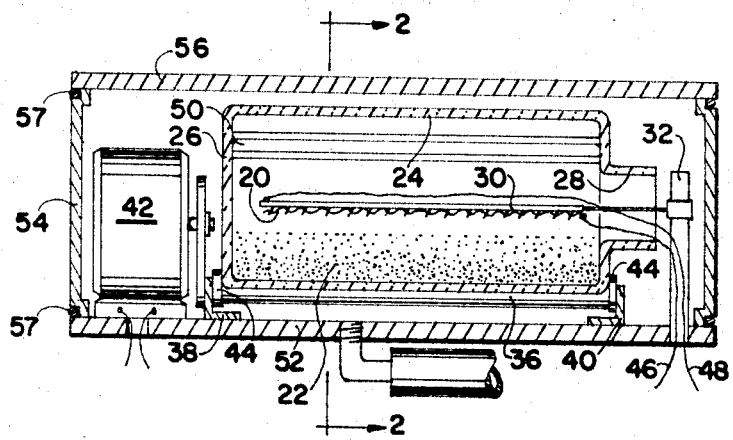
FIGURE 1 is a broken-away, side elevation of an apparatus for performing steps of a process of the present invention.
Figure 2:
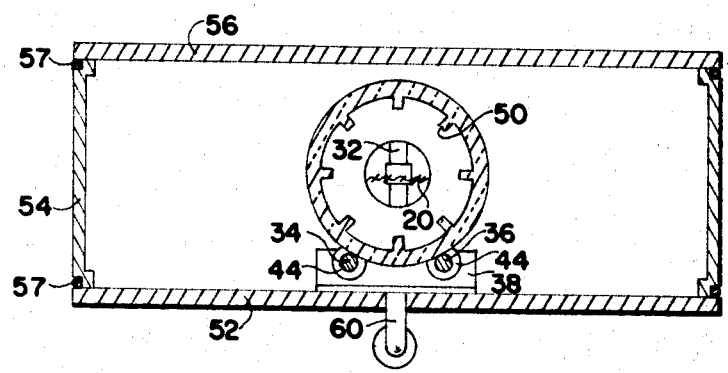
FIG. 2 is a cross section of the apparatus of FIGURE 1, taken substantially along the line 2—2.

FIGURE 1 illustrates an apparatus for evaporating an internal phase (dye developer) material 20 onto a matrix material 22 of large surface area per mass. Material 20, for example, is in the form of a coating upon a wire gauze and material 22, for example, is in the form of a finely divided powder composed of an organic plastic. Powder 22 is contained within a cylindrical glass jar 24, one end of which is closed at 26 and the other end of which is provided with an open mouth 28. Gauze 20 is supported by a mounting arm 30 extending through mouth 28 and carried by a standard 32. Jar 24 rests upon a pair of rollers 34 and 36, and ends of which are journaled in bearing mounts 38 and 40. A motor 42 is provided for rotating rollers 34 and 36 through gearing 37 in order to cause rotation of jar 24, which is prevented from moving longitudinally by circular flanges 44 at the ends of the rollers. As shown, electrical leads 46 and 48 are connected to the opposite extremities of gauze 20 in order to transmit a suitable electric current through the gauze from a power supply (not shown). In operation, a sufficient current is transmitted by leads 46 and 48 through gauze 20 for generating sufficient heat to cause rapid evaporation of the coating of gauze 20. At the same time, motor 42 causes rotation of rollers 34 and 36 so that powder 22 is continuously agitated by movement of the inner surfaces of jar 24 as well as a plurality of ribs 50 projecting inwardly from the inner surfaces of the jar. The apparatus, including jar 24, is mounted on a base plate 52 and enclosed by such means as a glass cylinder 54, and a cover plate 56. O-ring gaskets 57 hermetically seal glass cylinder 54 between base plate 52 and cover plate 56. A pump (not shown) continuously exhausts the region defined by base plate 52, glass cylinder 54 and cover plate 56 through a conduit 60. Powder 22, as a result, becomes coated with the evaporated dye developer. The coated powder then is heated and molded or dissolved and cast to form a two-phase solid comprising the vacuum deposited dye developer as an internal phase and the plastic of powder 22 as an external phase.

Figure 3:
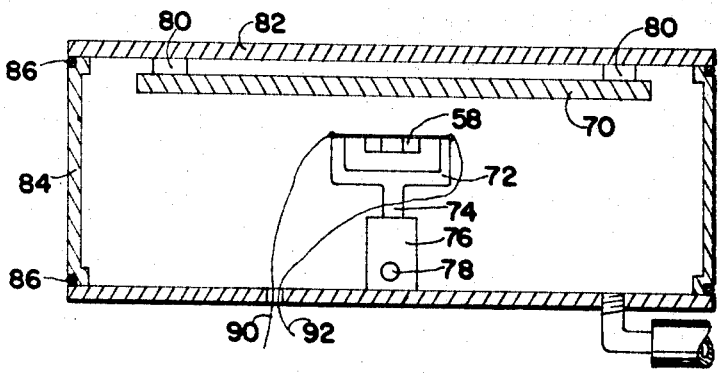
FIG. 3 is a broken-away, side elevation of an apparatus for performing steps of an alternative process of the present invention.
Figure 4:
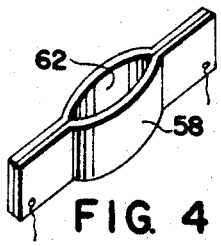
FIG. 4 is a perspective view of a component of the apparatus of FIG. 3.

An alternative method for producing a dispersion in accordance with the present invention is shown in FIGS. 3 and 4 as involving the volatilization of a quantity of an internal phase material (dye developer) 62, for example, within an electrically heated crucible 58, typically composed of tantalum, above which is located an extremely thin sheet of a matrix material 70 in the form of an organic plastic. An shown, crucible 58 is carried by a mount 72 having a depending shaft 72, which is adjustably secured in an upstanding sleeve 76 by a manually controlled screw 78. Sleeve 76 is carried by a base plate 77. Sheet 70 is carried by a pair of supports 80, in turn mounted under a cover plate 82. The region defined by the base plate 77 and cover plate 82 is enclosed by a glass cylinder 84, which is hermetically sealed between the base plate and the cover plate by a pair of upper and lower O-rings 86. In operation, the region defined by base plate 77, glass cylinder 84 and cover plate 82 is continuously exhausted by a pump (not shown) through a conduit 88 and crucible 58 is heated by a relatively large current supplied through a pair of leads 90 and 92. The coated sheet 70 then is heated and molded or dissolved and cast to form a two-phase solid comprising evaporated dye developer as an internal phase and the plastic of sheet 70 as an external phase.

As indicated above, although the process of the present invention has general utility, it is specifically applicable to certain products that are particularly useful in photographic color diffusion transfer processes. In such a diffusion transfer process, for example, a photoexposed silver halide material having a dye developer of desired color associated therewith, either in the same layer as the silver halide or in a contiguous underlying layer, is subjected to an aqueous alkaline processing solution as set forth in detail in U.S. Patent No. 2,983,606 issued May 9, 1961 to Howard G. Rogers, and to which reference should be had for such details. In developed areas the dye developer is immobilized by oxidation as a function of the development, while in undeveloped areas the dye developer is mobile and diffusible. Transfer of the mobile dye developer to a superposed image-receiving layer provides the desired color image. Plastic materials of which the external phase may be composed advantageously are cellulosics such as carboxymethyl cellulose and cellulose acetate hydrogen phthalate, vinyls such as polyvinyl alcohols, and natural polymers such as agar, casein, gelatin, etc. When the vacuum deposition is effected by evaporation, temperatures ranging from 300 to 1500° C., in accordance with the requirements of the material being evaporated, and pressures below 0.5 micron of mercury are common.

The process of the present invention also is particularly applicable to the production of the diffusion-transfer reversal assemblage capable of producing a multicolor print. Such an assemblage may comprise discrete strata in which a cyan dye developer is associated with a red-sensitive emulsion, a magenta dye developer is associated with a green-sensitive emulsion and a yellow dye developer is associated with a blue-sensitive emulsion. After the foregoing strata are photoexposed, a layer of alkaline aqueous processing solution may be spread between the assemblage and a print-receiving stratum. The various dye developers react with exposed portions of the silver halide emulsions with which they are associated. Portions of the dye developers so reacted are immobilized and portions of the dye developers remaining unreacted migrate through the various layers of the assemblage and the layer of alkaline aqueous solution to the print-receiving stratum where they form a multicolored print. In accordance with the present invention, the dye developers may be dispersed in their respective strata by evaporation, deposition and blending. In exposing an assemblage of the foregoing type, the outermost dye developer strata may be required to possess greater light transmission than the innermost dye developer stratum in order to permit the innermost stratum to be properly exposed. Toward this end the present invention enables the dye developers in the outer strata to be dispersed as small particles which do not impart as great a covering power as they would if dispersed in solid solution.

Figure 5:
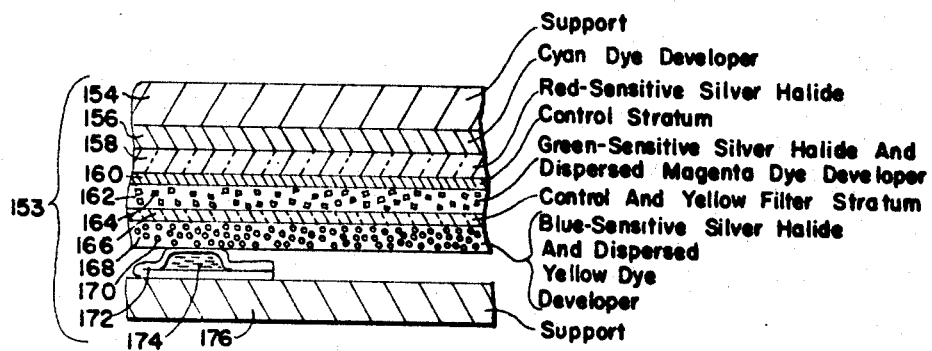
FIG. 5 is a flow diagram showing exaggerated cross-sectional views of materials containing a dye developer dispersion and undergoing steps of a photographic process in accordance with the present invention.

FIG. 5 illustrates at 153 such an assemblage comprising, in sequence, a support 154, a cyan dye developer stratum 156, a red-sensitive silver halide emulsion stratum 158, a spacer stratum 160, a green-sensitive stratum 162 containing discrete particles 164 of a magenta dye developer, a spacer and yellow filter stratum 166 and a blue-sensitive silver halide emulsion stratum 168 having dispersed therein discrete particles 170 of a yellow dye developer. A rupturable container 172 carries a processing composition 174 in the form of an aqueous alkaline solution to be spread in a thin layer between stratum 168 and a print-receiving stratum 176. The purpose of distributing magenta dye developer 164 and yellow dye developer 170 in particulate form is to render them available to perform their functions as described below, while at the same time to reduce their covering power in order to permit the transmission of light to photosensitive materials closer to support 154. Thus, for example, innermost photosensitive stratum 158, which need not transmit light to a layer closer to support 154, need not be so distributed and shown as being dispersed in solid solution. Excellent dispersions of the type shown at 164 and 170 may be produced, in accordance with the present invention, by vacuum depositing the dye developer upon a matrix, of the type described above, of large surface area per mass and blending. Yellow filter stratum 166 is provided for attenuating light of wave-lengths that must be prevented from affecting strata 162 and 158. In practice, when aqueous alkaline solution 174 is supplied in a thin layer between stratum 168 and print-receiving stratum 176, it permeates all the layers of assemblage 153. The process is such that red-sensitive emulsion 158, green-sensitive emulsion 162 and blue-sensitive emulsion 168 are differentially developed by cyan dye developer 156, magenta dye developer 164 and yellow dye developer 170, respectively, which in consequence, become immobilized, more specifically insolubilized. On the other hand, the unreacted cyan dye developer 156, magenta dye developer 164 and yellow dye developer 170 are free to migrate in the solution to print-receiving stratum 176 where they form a multicolored print. Spacer layers 160 and 166, which, for example, are composed of gelatin, operate to confine the developing action of the dye developers to the respective emulsion layers with which they are originally associated.

As examples of suitable dye developers for the foregoing purpose, mention may be made of 1-phenyl-3-N-n-hexylcarboxamido - 4 - [p - (2',5' - dihydroxyphenethyl)-phenylazo]-5-pyrazolone, for yellow; 2-[p-(2',5'-dihydroxyphenethyl)-phenylazo]-4-methoxy-1 - naphthol, for magenta; 1,4 - bis - [β - (2',5' - dihydroxyphenyl)-propylamino]-anthraquinone, for cyan. These dye developers have been evaporated onto polyvinyl alcohol flake, the coated flake dispersed in water and coated to form dye developer layers in photosensitive monochrome elements. Processing in accordance with the disclosure of the aforementioned U.S. Patent No. 2,983,606 gave positive monochrome transfer images.

The herein disclosed embodiments of the present invention thus provide a variety of techniques for controlling the particle size of dispersion of dye developers. In addition, this method of forming dye developer dispersions avoids problems introduced by liquid dispersions, e.g., susceptibility to oxidation, stain from dispersion components, etc.

Although the disclosure has emphasized the formation of dye developer dispersions, it will be apparent that other dyes may be incorporated in photographic products in like manner. Filter dyes and antihalation dyes are two examples of such dyes, the control of particle size permitting flexibility in obtaining a desired level of filtration or light absorption. As examples of other types of dyes which may be advantageously dispersed in accordance with this invention mention may be made of refractory dyes, e.g., quininoid vat dyes such as indigo, thioindigo, 6,6′-dibromoindigo and indanthrone, phthalocyanines such as phthalocyanine, copper or lead phthalocyanine, and benzanthrone dyes such as anthraquinolinequinone, 1-benzoyl naphthalene and benzanthrone.

Since certain changes may be made in the above products, processes and compositions without departing from the scope of the invention herein involved, it is intended that all matter contained in the above description or shown in the accompanying drawings shall be interpreted as illustrative and not in a limiting sense.

What is claimed is:

1. A photosensitive element useful for the formation of color images and comprising a support, a layer having a dye developer dispersed therein carried by one side of said support, and a photosensitive silver halide layer carried by said dye developer containing layer, said layer having said dye developer dispersed therein being formed by vacuum depositing said dye developer upon an organic plastic material in a form presenting a large surface area, mixing said vacuum deposited dye developer and said organic polymeric material with a liquid which is a solvent for said organic polymeric material and a nonsolvent for said dye developer, thereby dissolving said organic plastic material in said liquid and forming a fine dispersion comprising said dye developer as the discontinuous phase and said organic plastic material as at least part of the continuous phase, and coating said fine dispersion in a thin stratum upon said support.

2. The method of forming a fine dispersion of a dye developer, said method comprising the steps of a vacuum depositing said dye developer upon an organic plastic material presenting a large surface area and mixing said vacuum deposited dye developer and said organic plastic material with a solvent for said organic plastic material, said solvent being a nonsolvent for said dye developer, thereby dissolving said organic plastic material and forming a fine dispersion comprising said vacuum deposited dye developer as the discontinuous phase and said solvent and said organic plastic material as at least part of the continuous phase of said dispersion.

References Cited

UNITED STATES PATENTS 2,713,004    7/1955    Greenstein _____ 117—119

OTHER REFERENCES

The Merck Index: sixth edition, pp. 478 and 524, Merck and Co., Rahway, N.J. (1952).

J. TRAVIS BROWN, *Primary Examiner.*